United States Patent [19]

Hattori

[11] Patent Number: 4,462,490
[45] Date of Patent: Jul. 31, 1984

[54] CONTROL SYSTEM FOR OPERATION OF FLUID TORQUE CONVERTER FOR VEHICLES

[75] Inventor: Torao Hattori, Wako, Japan
[73] Assignee: Honda Giken Kogyo Kabushiki Kaisha, Tokyo, Japan
[21] Appl. No.: 325,764
[22] Filed: Nov. 30, 1981
[30] Foreign Application Priority Data

Nov. 29, 1980 [JP] Japan .............................. 55-168525

[51] Int. Cl.³ .................... B60K 41/02; F16D 25/02; F16D 41/08
[52] U.S. Cl. ............................... 192/0.076; 192/3.31; 192/45; 192/85 A; 192/103 R
[58] Field of Search ................... 192/0.076, 3.28, 3.29, 192/3.3, 3.31, 70.28, 3.57, 103 R, 45, 41 R, 48.92, 85 A, 66, 38, 0.096, 0.075; 74/868

[56] References Cited

U.S. PATENT DOCUMENTS

| | | | |
|---|---|---|---|
| 2,144,074 | 1/1939 | Maybach | 192/0.076 |
| 4,081,065 | 3/1978 | Smyth et al. | 192/0.076 |
| 4,086,994 | 5/1978 | Hirosawa et al. | 192/0.075 |
| 4,173,270 | 11/1979 | Croswhite et al. | 192/3.29 |

FOREIGN PATENT DOCUMENTS 635606  9/1936  Fed. Rep. of Germany ..... 192/3.28

Primary Examiner—George H. Krizmanich
Attorney, Agent, or Firm—Armstrong, Nikaido, Marmelstein & Kubovcik

[57] ABSTRACT

A control system is provided for the operation of a fluid torque converter for vehicles comprising a pump wheel connected to an engine output shaft, and a turbine wheel connected to a turbine shaft which is coupled to a driving wheel. A fluid transmits power between the pump wheel and the turbine wheel and a one-way clutch is provided between the engine output shaft and turbine shaft for connecting and disconnecting these shafts to and from each other. The one-way clutch, when in an engaged state, directly couples the engine output shaft and the turbine shaft to transmit power solely from the engine output shaft to the turbine shaft. The one-way clutch is provided with a load capacity control unit adapted to vary the load capacity thereof when the one-way clutch is in an engaged state.

8 Claims, 5 Drawing Figures

CONTROL SYSTEM FOR OPERATION OF FLUID TORQUE CONVERTER FOR VEHICLES

BACKGROUND OF THE INVENTION

1. Field of the Invention

This invention relates to a control system for operation of a fluid torque converter for vehicles which is capable of transmitting power from an engine output shaft to a turbine shaft connected to a driving wheel by a fluid transmission operation in a speed change region, and connecting the engine output shaft to the turbine shaft directly in a clutch-operating region.

2. Description of the Prior Art

A fluid torque converter is designed to transmit power generated by an engine from a pump wheel connected to an engine output shaft to a turbine wheel connected to a turbine shaft by a fluid transmission operation. During a fluid transmission operation, slipping necessarily occurs between the pump wheel and turbine wheel which results in a decrease in the transmission efficiency. In order to improve the transmission efficiency, the pump wheel and turbine wheel are connected together directly with a hydraulic or centrifugal direct-coupling clutch to shift the fluid transmission operation to a mechanical transmission operation. The direct-coupling clutch is designed in such a manner that it is usually actuated when the vehicle is running at a comparatively high speed, for example, when the transmission is in the highest position. When the direct-coupling clutch is in a coupled state, the transmission system receives a shock caused by the sudden acceleration or deceleration of the engine. This undesirably deteriorates the driving condition.

SUMMARY OF THE INVENTION

Therefore, a primary object of the present invention is to provide a control system for operation of a fluid torque converter for vehicles, which is provided between an engine output shaft and a turbine shaft with a one-way clutch capable of connecting and disconnecting the output and turbine shafts to and from each other, to make the most of the advantages of a direct-coupling clutch employed in a conventional control system of this kind and cover up the faults thereof. This results in a reduction of the shock imparted to a transmission system when the engine is suddenly decelerated while a high transmission efficiency is maintained when the vehicle is running at a high speed, thereby improving the driving condition.

A second object of the present invention is to provide a control system for operation of a fluid torque converter for vehicles which is provided with a means for varying the load capacity, i.e., the connecting power, of the above-mentioned one-way clutch whereby, when an excess load higher than the load capacity of the one-way clutch is applied from the engine output shaft to the clutch with the one-way clutch in a coupled state when the engine is suddenly accelerated, the one-way clutch is rotated loosely for a time to lighten or absorb the shock imparted to the transmission system. Thereby the driver has a better ride, not only when the engine is decelerated, but also when the engine is accelerated.

The above and other objects and advantageous features of the present invention will become apparent from the following description of the preferred embodiment, when taken in conjunction with the accompanying drawings.

BRIEF DESCRIPTION OF THE DRAWINGS

The accompanying drawings show an embodiment of the present invention wherein.

DESCRIPTION OF THE PREFERRED EMBODIMENT

Figure 1:
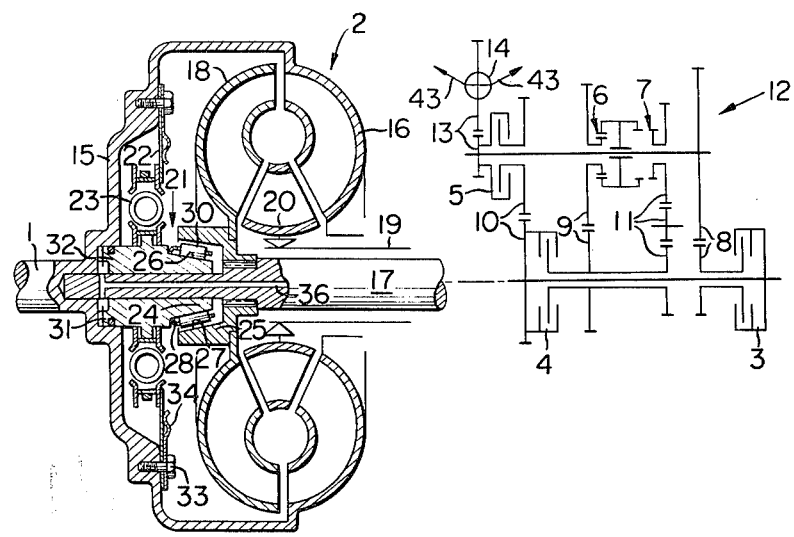
FIG. 1 is a partially cutaway view in schematic representation of a power transmission system for vehicles, to which a control system according to the present invention is applied.

An embodiment of the present invention will now be described with reference to the accompanying drawings:

As shown in FIG. 1, the power from an engine (not shown) is transmitted to a driving wheel (not shown) via an engine output shaft 1, a fluid torque converter 2, a transmission 12 having trains of speed change gears consisting of low-speed, intermediate speed, high speed and reverse gears 8, 9, 10, 11 for three forward speeds and one reverse speed. The operation of the gears is controlled by hydraulically operated low, intermediate and high speed clutches 3, 4, 5 and first and second dog clutches 6, 7, reduction gears 13, differential gears 14 and a wheel driving shaft.

The fluid torque converter 2 consists of a pump wheel 16 connected to the engine output shaft 1, a turbine wheel 18 connected to a turbine shaft 17 coupled to the transmission 12 and a stator wheel 20 connected to a stator shaft 19.

A one-way clutch 21 is provided between the engine output shaft 1 and turbine shaft 17. The clutch 21 connects and disconnects the shafts 1 and 17 to and from each other, transmitting power in only one direction from the engine output shaft 1 to the turbine shaft 17 when the shafts 1 and 17 are connected together and varies the load capacity thereof, i.e., the connecting power thereof. The construction of the one-way clutch 21 will be described.

Figure 2:
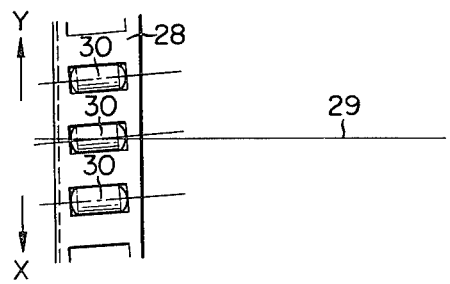
FIG. 2 is a plan view of a part of a roller retainer and wedge rollers in the one-way clutch shown in FIG. 1.

The one-way clutch 21 is fitted around a part of the turbine shaft 17 in such a manner that the one-way clutch 21 can be rotated and axially slid. The one-way clutch 21 consists of a driving member 24 connected to a pump case 15 via a drive plate 22 and a buffer 23. A driven member 25 is spline-connected to the turbine shaft 17 so as to be moved slidingly in the axial direction and is fixedly joined to the inner circumferential surface of the turbine wheel 18. Cylindrical wedge rollers 30 are provided between parallel-spaced driving and driven conical surfaces 26 and 27 constituting the outer and inner circumferential surfaces of the driving and driven members 24 and 25. The wedge rollers are held as shown in FIG. 2, i.e., in a roller retainer 28 in such a manner that the wedge rollers 30 are inclined with respect to a bus line 29 of an imaginary conical surface extending halfway between the conical driving and driven surfaces 26 and 27. The driving member 24 has a piston 32 formed integrally therewith and adapted to be slidingly fitted into a hydraulic cylinder 31 formed on the inner circumferential surface of the pump case 15. The driving member 24 is urged in the direction in which the driving member 24 is moved away from the driven member 25, i.e., in the leftward direction in FIG. 1, by a spring 34 fastened at its one end together with the drive plate 22 to the pump case 15 with bolts 33. When pressurized oil is supplied to the hydraulic cylinder 31, the driving member 24 is moved to the right in FIG. 1 along the turbine shaft 17 via the piston 32 to bring the wedge rollers 30 into pressing contact with the conical driving and driven surfaces 26,27. As a result, the one-way clutch 21 is put in a coupled state to allow the engine output shaft 1 and turbine shaft 17 to be connected directly to each other. When the driving member 24 is then rotated in the X-direction in FIG. 2 with respect to the driven member 25, the wedge rollers 30 engage with the conical driving and driven surfaces 26,27 so that power is transmitted from the driving member 24 to the driven member 25. When the driving member 24 is rotated in the Y-direction in FIG. 2 with respect to the driven member 25, the wedge rollers 30 are disengaged from the driving and driven surfaces 26,27 and are loosely rotated so that power is not transmitted from the driven member 25 to the driving member 24. Thus, when the one-way clutch 21 is in a coupled state, the power is transmitted mechanically from the engine output shaft 1 to the turbine shaft 17. On the other hand, a reverse load transmitted from the driving wheel to the turbine shaft 17 when the engine is decelerated is transmitted from the turbine shaft 17 to the engine output shaft 1 by fluid transmission due to the loose rotation of the one-way clutch 21.

A load capacity control unit 35 controls the supplying and discharging of working oil into and from the hydraulic cylinder 31 in the one-way clutch 21 to vary the load capacity thereof.

Figure 3:
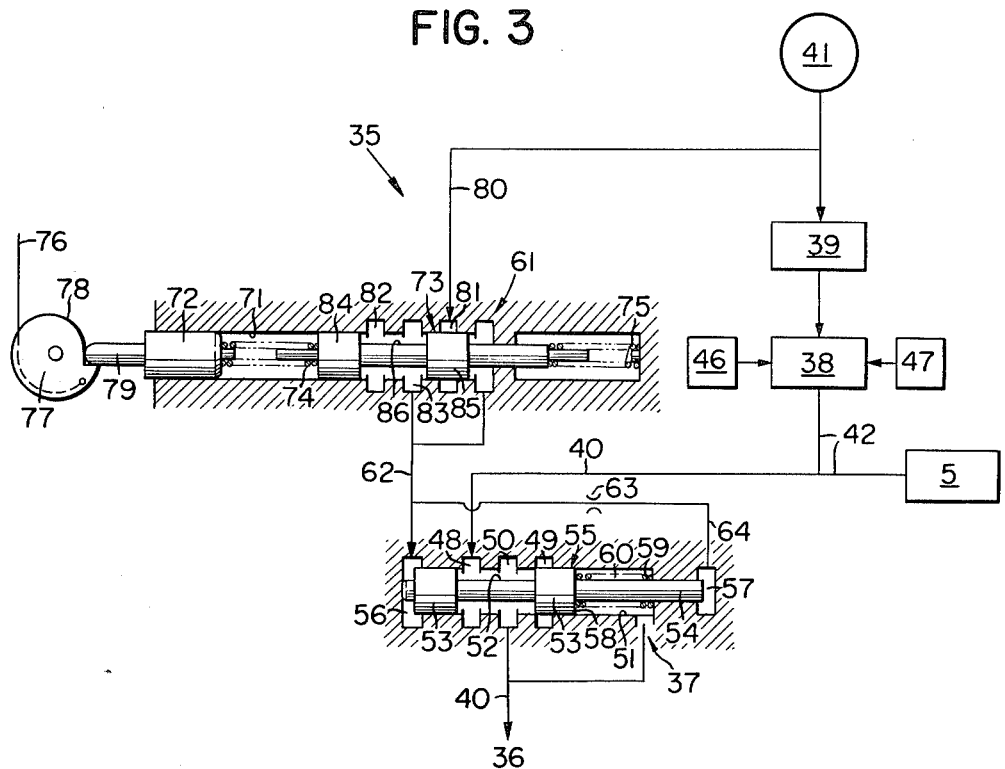
FIG. 3 is a diagram of a hydraulic circuit illustrating a first embodiment of a load capacity control unit of the present invention.

Referring to FIG. 3, the hydraulic cylinder 31 in the one-way clutch 21 communicates with an oil passage 42 which communicates the high speed clutch 5 for controlling the operation of the high speed gear train 10 in the transmission 12 with a hydraulic pressure source 41, via an oil passage 36 formed in the turbine shaft 17 and an oil passage 40 provided with a hydraulic pressure control valve 37 therein. The oil passage 42, which couples the high speed clutch 5 and hydraulic pressure source 41, is provided therein with a shift valve 38 and manual valve 39. The operation of the shift valve 38 is controlled by a first hydraulic pressure generator 46 adapted to generate a hydraulic pressure in accordance with vehicle speed, and a second hydraulic pressure generator 47 adapted to generate a hydraulic pressure in accordance with the degree of opening of a throttle. The valves 38 and 39 are connected in series.

The hydraulic pressure control valve 37 consists of a cylinder 51 having a high pressure port 48 communicating with the shift valve 38, a low pressure port 49 communicating with an oil tank and an intermediate pressure port 50 provided between the high and low pressure ports 48 and 49 and communicating with the hydraulic cylinder 31 in the one-way clutch 21 and the oil passage 36 in the turbine shaft 17. A valve body 55 is slidably fitted in the cylinder 51 and has larger diameter portions 53 between which an annular recess 52 is formed, and a smaller diameter portion 54. First and second oil chambers 56 and 57 are provided at a larger diameter end portion and a smaller diameter end portion, respectively, so as to control the operation of the valve body 55 on the basis of the difference between the pressure receiving area of the larger diameter end portion thereof and that of the smaller diameter end portion thereof. A coiled spring 60, which surrounds the smaller diameter portion 54, is positioned between a shoulder 58 formed at an interface of the larger and smaller diameter portions 53 and 54 and a stepped portion 59 of a wall of the cylinder 51. The valve body 55 is urged by the coiled spring 60 toward the first oil chamber 56. The annular recess 52 formed in the larger diameter portion 53 constantly communicates with the intermediate port 50 in the cylinder 51. The area of opening of the high pressure port 48 with respect to the annular recess 52 is the largest when the valve body 55 is in the extreme left position shown in FIG. 3. When the valve body 55 receives hydraulic pressure at both end portions thereof, it moves gradually from the position shown in FIG. 3 to the right due to the difference between the pressure receiving areas of both end portions thereof and the area of opening of the high pressure port 48 with respect to the recess 52 is gradually reduced, while the area of opening of the low pressure port 49 with respect to the same recess 52 is gradually increased. Accordingly, the hydraulic pressure in the hydraulic cylinder 31, which communicates with the intermediate port 50 of the hydraulic pressure control valve 37 in the one-way clutch 21, is the highest when the valve body 55 is in the extreme left position in FIG. 3 and decreases gradually as the valve body 55 is moved to the right in FIG. 3.

The first oil chamber 56 communicates with the hydraulic pressure source 41 via an oil passage through a throttle responding valve 61, which is adapted to generate hydraulic pressure in accordance with the degree of opening of a throttle. The second oil chamber 57 communicates via an oil passage 64 having an orifice 63 therein with an oil passage 62, which couples the first oil chamber 56 and throttle-responding valve 61.

The throttle responding valve 61 consists of a cylinder 71 and a throttle rod 72 adapted to be moved in accordance with the degree of opening of the throttle, which is slidably fitted in the cylinder 71. A spool valve 73 is adapted to control the hydraulic pressure in the first and second oil chambers 56 and 57 in the hydraulic pressure control valve 37, and is slidably fitted in the cylinder 71. A spring 74 is positioned between the throttle rod 72 and the spool valve 73 and a spring 75 urges the spool valve 73 toward the throttle rod 72. The throttle rod 72 has an end portion which extends outside of the cylinder 71 with a cam follower 79 formed integrally therewith. The cam follower 79 is engageable with a cam surface 78, which is the outer circumferential surface of the throttle cam 77 which regulates the degree of opening of the throttle by operating a throttle cable 76. Therefore, when the throttle cable 76 is operated to rotate the throttle cam 77 clockwise in FIG. 3, i.e., when the degree of opening of the throttle is increased, the throttle rod 72 is pushed to the right in FIG. 3 to cause the spool valve 73 to be moved in the same direction via the spring 74 against the spring 75. The cylinder 71 has a high pressure port 81 which communicates with the hydraulic pressure source 41 via an oil passage 80, a low pressure port 82 which communicates with the oil tank, and an intermediate pressure port 83 provided between the high and low pressure ports 81,82 which communicates with the first and second oil chambers 56 and 57 in the hydraulic pressure control valve 37 via the oil passages 62 and 64. The spool valve 73 has first and second lands 84 and 85 and an annular recess 86 formed therebetween. When the throttle responding valve 61 is in the position shown in FIG. 3, i.e., when the degree of opening of the throttle is nearly zero, the intermediate port 83 communicates with the low pressure port 82 via the annular recess 86 and is shut off at the same time from the high pressure port 81 due to the second land 85. When the throttle cam 77 is rotated clockwise to increase the degree of opening of the throttle gradually, the spool valve 73 is gradually moved from the position shown in FIG. 3 to the right against the spring 75 via the throttle rod 72 and spring 74. Consequently, the area of opening of the low pressure port 82 with respect to the annular recess 86 is gradually decreased, while the area of opening of the high pressure port 81 with respect to the annular recess 86 is gradually increased. Therefore, when the degree of opening of the throttle is increased gently, the pressure of the oil supplied from the intermediate port 83 of the throttle responding valve 61 to the first and second oil chambers 56 and 57 in the hydraulic pressure control valve 37 via the oil passages 62 and 64 is also increased gently. As a result, the valve body 55 is moved gradually from the position shown in FIG. 3 to the right in proportion to the ratio of pressure receiving area of the larger diameter end portion thereof to that of the smaller diameter end portion thereof, and an increase in the hydraulic pressures in the first and second oil chambers 56 and 57. The area of opening of the high pressure port 48 with respect to the annular recess 52 is thus decreased, while the area of opening of the low pressure port 49 with respect to the annular recess 52 is increased at the same time. Accordingly, the pressure in the hydraulic cylinder 31 in the one-way clutch, which communicates via the oil passages 36 and 40 with the intermediate port 50 which is constantly opened to the annular recess 52, is gradually decreased so that the load capacity of the one-way clutch 21 is also decreased. When the degree of opening of the throttle is gradually increased as mentioned above, the pressure of the oil supplied from the intermediate port 83 of the throttle responding valve 61 to the first and second oil chambers 56 and 57 in the hydraulic pressure control valve 37 is increased gradually and flow is restricted by the orifice 63 in the oil passage 64. In order to permit the hydraulic pressure in the hydraulic cylinder 31 in the one-way clutch 21, i.e., the load capacity of the one-way clutch 21, to be greater than a maximum torque of the engine even when the degree of opening of the throttle reaches the maximum level, the hydraulic pressure supplied from the hydraulic pressure source 41 to the first and second oil chambers 56 and 57 in the hydraulic pressure control valve 37 via the throttle-responding valve 61, and the ratio of pressure receiving area of the larger diameter end portion of the valve body 55 to that of the smaller diameter end portion thereof, are set to suitable levels.

On the other hand, when the degree of opening of the throttle is suddenly increased, the throttle cam 77 is rotated clockwise suddenly so that the spool valve 73 is quickly moved to the right against the spring 75 via the throttle rod 72 and spring 74. Consequently, the pressure in the first oil chamber 56 in the hydraulic pressure control valve 37 is suddenly increased due to the pressurized oil flowing thereinto from the intermediate port 83 of the throttle responding valve 61 through the oil passage 62. However, the pressurized oil introduced into the second oil chamber 57 through the oil passage 64 is restricted by the orifice 63 so that the pressure in the second oil chamber 57 is gradually increased. Consequently, the valve body 55 is quickly moved to the right due to the hydraulic pressure difference occurring between the first and second oil chambers 56 and 57 to cause the area of opening of the high pressure port 48, with respect to the annular recess 52, to be decreased and the area of opening of the low pressure 49, with respect to the same recess 52, to be increased. As a result, the pressurized oil in the hydraulic cylinder 31 in the one-way clutch 21 is discharged into the oil tank through the oil passages 36 and 40, intermediate port 50, annular recess 52 and low pressure port 49 to quickly reduce the pressure in the hydraulic cylinder 31. The load capacity, i.e., the connecting power, of the one-way clutch 21 is thus decreased. In the above case, the engine output is increased rapidly in accordance with the sudden increase in the degree of opening of the throttle, and a torque transmitted to the driving member 24 of the one-way clutch is also increased rapidly. However, the load capacity of the one-way clutch 21, i.e., the amount of force applied from the driving member 24 to the driven member 25 is rapidly decreased as mentioned above. Therefore, even when an excessive load higher than the decreased load capacity is applied to the driving member 24, the driving and driven members 24 and 25 are rotated relatively so that a load in excess of the load capacity of the one-way clutch 21 is not transmitted to the driven member 25. Accordingly, a shock occurring when the engine is suddenly accelerated is not transmitted to the power transmission system on the downstream side of the driven member 25. When the amount of excessive load is large, slipping between the driving and driven members 24 and 25, i.e., the relative rotations thereof, is increased and the transmission of power from the engine output shaft 1 to the turbine shaft 17 is automatically shifted to the fluid transmission from the pump wheel 16 to the turbine wheel 18. Since the difference between the hydraulic pressures in the first and second oil chambers 56 and 57 in the hydraulic pressure control valve 37 is decreased in time and becomes zero after a predetermined period of time has elapsed, the valve body 55 is moved to the extreme right position in FIG. 3 and then to the left as the difference between the hydraulic pressures in the first and second oil chambers 56 and 57 is decreased. As a result, the hydraulic pressure in the hydraulic cylinder 31 in the one-way clutch 21 is increased until the hydraulic pressure in the first and second oil chambers 56 and 57 have been balanced with each other. In consequence, the load capacity of the one-way clutch, which is decreased temporarily with the sudden increase in the degree of opening of the throttle, is increased gradually to regain the original level after a predetermined period of time has elapsed to allow the fluid transmission to be shifted again automatically to the mechanical transmission.

Figure 4:
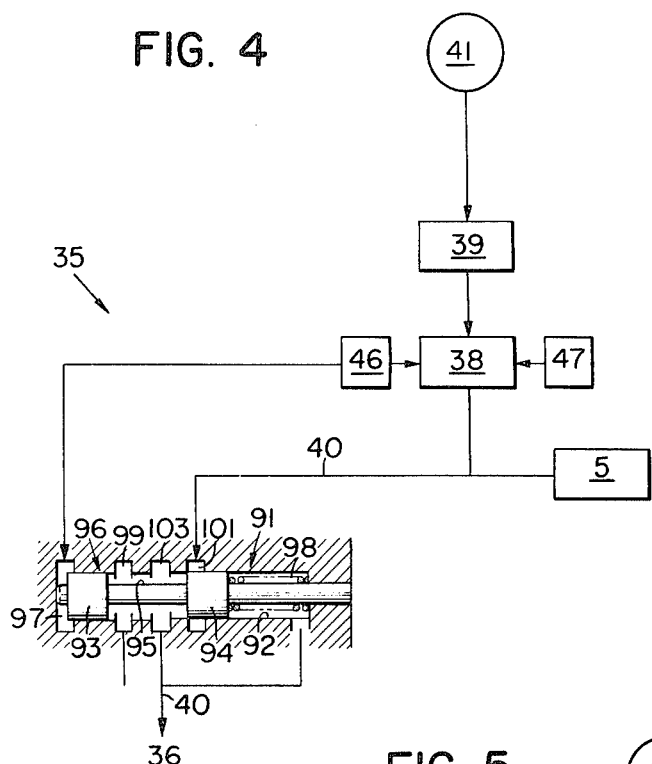
FIG. 4 is a diagram of a hydraulic circuit illustrating a second embodiment of a load capacity control unit.

FIG. 4 shows another embodiment of the load capacity control unit. In this embodiment, the operation of a hydraulic pressure control valve 91 is controlled in accordance with a vehicle speed alone. The hydraulic pressure control valve 91 is provided in an oil passage 40 coupled to a shift valve 38, the operation of which is controlled by first and second hydraulic pressure generators 46 and 47 in accordance with a vehicle speed and the degree of opening of the throttle. The pressure valve 91 is coupled to an oil passage 36 in the turbine shaft 17. The elements of the load capacity control unit shown in FIG. 4, which are identical with elements employed in the load capacity control unit shown in FIG. 3, are designated by the same reference numerals used therein.

The hydraulic pressure control valve 91 according to the embodiment shown in FIG. 4 will be described. A valve body 96 having first and second lands 93 and 94 and an annular recess 95 formed therebetween is slidably fitted in a cylinder 92. One end of the valve body 96 faces an oil chamber 97, into which hydraulic pressure in accordance with a vehicle speed is introduced from a first hydraulic pressure generator 46, and the other end thereof is connected to a spring 98 adapted to urge the valve body toward the oil chamber 97. The cylinder 92 is provided with a low pressure port 99, which communicates with an oil tank, a high pressure port 101, which communicates with the shift valve 38 and an intermediate port 103 formed between the low and high ports 99 and 101, which communicates with the oil passage 36 in the turbine shaft 17.

In the load capacity control unit of the above-described construction, the hydraulic pressure in the oil chamber 97 is lower than a set load for the spring 98 until the vehicle speed has exceeded a predetermined level and the valve body 96 is retained by the spring 98 in a pressed state in the extreme left position as shown in FIG. 4. The intermediate port 103, which communicates with a hydraulic cylinder 31 in a one-way clutch 21, communicates with the low pressure port 99 via the annular recess 95. Accordingly, the pressure in the oil cylinder 31 in the oneway clutch 21 is low so that the one-way clutch 21 is in a separated or disengaged state. When the vehicle speed has exceeded a predetermined level, the hydraulic pressure in the oil chamber 97 becomes higher than the set load for the spring 98 to allow the valve body 96 to move to the right in FIG. 4. In consequence, the intermediate port 103 is shut off from the low pressure port 99 and communicates with the high pressure port 101. Thus, the hydraulic cylinder 31 in the one-way clutch 21 communicates with the oil source 41 so that the one-way clutch 21 is moved to a coupled or engaged state.

Figure 5:
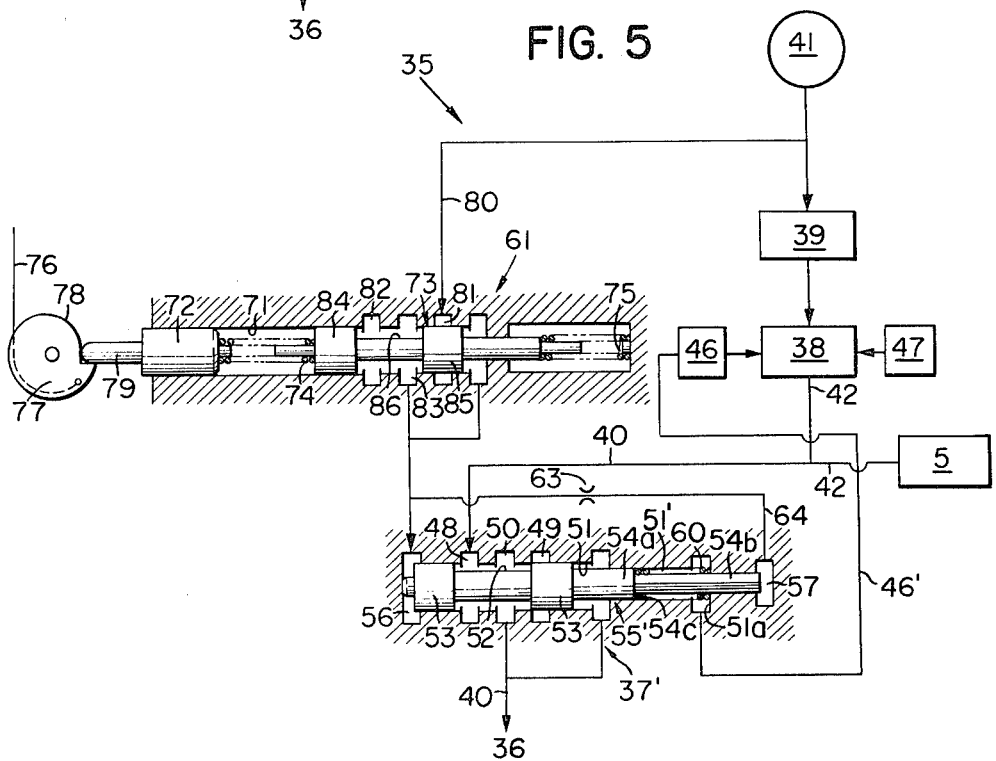
FIG. 5 is a diagram of a hydraulic circuit illustrating a third embodiment of a load capacity control unit.

FIG. 5 shows still another embodiment of the load capacity control unit. In this example, the operation of a hydraulic pressure control valve 37', which is adapted to control the hydraulic pressure in an oil cylinder 31 in a one-way clutch 21, is controlled in accordance with the degree of opening of a throttle and vehicle speed. This embodiment is substantially the same as the embodiment shown in FIG. 3, except for the differences of the hydraulic pressure control valve 37' to be described. The elements of the embodiment shown in FIG. 5 which are identical with any elements employed in the embodiment shown in FIG. 3 are designated by the same reference numerals shown therein.

A smaller diameter portion of a valve body 55' of the hydraulic pressure control valve 37' consists of a first smaller diameter region 54a and a second smaller diameter region 54b, the diameter of which is smaller than that of the first smaller diameter region 54a. A coiled spring 60 is positioned between a shoulder 54c formed at the interface between the first and second smaller diameter regions 54a and 54b and a stepped portion 51a of the cylinder 51. Hydraulic pressure in accordance with vehicle speed is applied from a first hydraulic pressure source 46 to a third oil chamber 51' through an oil passage 46'. The oil chamber 51' is formed between the outer circumferential surface of the second smaller diameter region 54b and the inner circumferential surface of the cylinder 51. The hydraulic pressure is applied to a pressure receiving surface formed on the shoulder 54c of the first smaller diameter region 54a. The amount of pressure applied to the valve body 55' in the rightward direction due to the difference between the pressure receiving areas of both ends thereof is higher than the amount of pressure applied to the valve body 55' in the leftward direction due to the resilient force of the coiled spring 60 and the hydraulic pressure in the third oil chamber 51' until the vehicle speed has exceeded a predetermined level. Accordingly, the valve body 55' is moved to the right in FIG. 5. Since the pressure in the hydraulic cylinder 31 in the one-way clutch 21 is comparatively low, the one-way clutch 21 is in a separated or disengaged state. When the vehicle speed has exceeded a predetermined level, the hydraulic pressure in the third oil chamber 51' is increased to allow the valve body 55' to be moved to the left. As a result, the pressure in the hydraulic cylinder 31 is increased to move the one-way clutch 21 into a coupled or engaged state.

When the degree of opening of the throttle is increased suddenly while the vehicle is running at a predetermined speed, hydraulic pressure in accordance with the degree of opening of the throttle is applied as mentioned above from the hydraulic pressure source 41 to the first and second oil chambers 56 and 57 in the hydraulic pressure control valve 37' through the throttle responding valve 61. As a result, the pressure in the first oil chamber 56 is increased more rapidly than that in the second oil chamber 57 because of the operation of the orifice 63 provided in the oil passage 64 and thus the valve body 55' is moved to the right in FIG. 5, so that the hydraulic pressure in the hydraulic cylinder 31 in the one-way clutch 21 is decreased temporarily. In the meantime, the engine torque is increased suddenly and a shock occurring at such time is lightened due to the slipping occurring in the one-way clutch as previously referred to in the description of the embodiment of the load capacity control unit shown in FIG. 3.

The hydraulic pressure in accordance with the vehicle speed, which is applied to the third oil chamber 51' in the hydraulic pressure control valve 37', causes an operation similar to the operation described previously with reference to the example of the load capacity control unit shown in FIG. 4 and is carried out in connection with the degree of opening of the throttle. When a vehicle speed is decreased below a predetermined level with the degree of opening of the throttle at a comparatively high level, the hydraulic pressure in the third oil chamber 51' in the hydraulic pressure control valve 37' is also decreased and the valve body 55' is moved to the right in FIG. 5. In consequence, the hydraulic pressure in the hydraulic cylinder 31 in the one-way clutch 21 is decreased so that the mechanical transmission operation of the one-way clutch is shifted automatically to a fluid transmission operation by the fluid torque converter 2. When a vehicle speed is increased over a predetermined level, the hydraulic pressure in the third oil chamber 51' is increased to cause the valve body 55' to be moved to the left in FIG. 5. Consequently, the pressure in the hydraulic cylinder 31 in the one-way clutch 21 is increased and the fluid transmission operation is shifted again automatically to a mechanical transmission operation by the one-way clutch.

According to the first invention described above, a one-way clutch is provided between an engine output shaft and a turbine shaft. The one-way clutch is capable of connecting and disconnecting shafts to and from each other and permits, when it is in a coupled state connecting the shafts directly together, transmission of power in one direction only or solely from an engine output shaft to a turbine shaft. When the one-way clutch is in a separated state, a fluid transmission operation by the fluid torque converter can be obtained. When the one-way clutch is in a coupled state, the engine output shaft and the turbine shaft are directly connected together to transmit power from the engine output shaft to the turbine shaft by a mechanical transmission operation and thereby improve the transmission efficiency. A reverse load is transmitted from the driving wheel to the turbine shaft when the engine is decelerated and is transmitted from the turbine shaft to the engine output shaft by the fluid transmission operation carried out by a loose rotation of the one-way clutch. Accordingly, a shock applied to the power transmission system when the engine is decelerated can be lightened effectively during the fluid transmission operation to allow the driver to have a consistently good ride. This invention also permits preventing the engine from being rotated at a high speed when a reverse load is applied thereto from the driving wheel while the vehicle is running by the inertial force, to thereby contribute to fuel economy.

According to the second invention, the one-way clutch provided between the engine output shaft and turbine shaft is capable of connecting and disconnecting the shafts to and from each other, and is provided with a load capacity control unit which is capable of varying a load capacity of the one-way clutch when it is in a separated state. Therefore, when the engine is accelerated suddenly while the one-way clutch is in a coupled state, the load capacity, i.e., the connecting power, thereof is decreased temporarily to cause the one-way clutch to slip and thereby prevent the power transmitted from the engine output shaft to the turbine shaft from being suddenly increased. Thus, a shock applied to the power transmission system when the engine is accelerated suddenly can be lightened. Accordingly, the engine can be accelerated smoothly even when the one-way clutch is in a coupled state. This allows a driver to have a better ride, not only when the engine is decelerated suddenly, but also when the engine is accelerated suddenly.

When a one-way clutch having a driving member is connected to an engine output shaft and provided with a conical, driving outer circumferential surface, a driven member is connected to a turbine shaft and provided with a conical, driven, outer circumferential surface opposed to the above-mentioned conical, driving surface, and wedge rollers are provided between the driving and driven members, which driving and driven members are capable of being engaged with and disengaged from each other, slipping occurs between the driving and driven members when the load capacity of the one-way clutch is decreased temporarily at such time that the one-way clutch is moved into a coupled state. The occurrence of wear on, and the generation of heat by, the driving and driven members due to the slipping thereof can be limited to as great an extent as possible due to the rolling of the wedge rollers.

While the invention has been described with reference to a preferred embodiment thereof, it will be understood by those skilled in the art that various modifications may be made without departing from the spirit or scope of the following claims.

What is claimed:

1. A control system for operation of a fluid torque converter for vehicles comprising:
    (a) an engine having an output shaft;
    (b) a pump wheel connected to said output shaft;
    (c) a driving wheel;
    (d) a turbine shaft connected to said driving wheel;
    (e) a turbine wheel connected to said turbine shaft;
    (f) a fluid for transmission of power between said pump wheel and said turbine wheel; and
    (g) a one-way clutch means coupled between said output shaft and said turbine shaft for connecting and disconnecting said shafts to and from each other, said one-way clutch means, when engaged, directly connecting said output shaft and said turbine shaft to transmit power from said output shaft to said turbine shaft, said one-way clutch means including:
    a driving member connected to said output shaft and provided with a conical, driving outer circumferential surface,
    a driven member connected to said turbine shaft and provided with a conical, driven inner circumferential surface opposed to said conical driving surface,
    wedge rollers provided between said driving and driven members, and
    means associated with said driving member for engaging and disengaging said driving and driven members with and from each other in response to hydraulic pressure applied thereto.

2. A control system for operation of a fluid torque converter for vehicles comprising:
    (a) an engine having an output shaft;
    (b) a pump wheel connected to said output shaft;
    (c) a driving wheel;
    (d) a turbine shaft connected to said driving wheel;
    (e) a turbine wheel connected to said turbine shaft;
    (f) a fluid for the transmission of power between said pump wheel and said turbine wheel;
    (g) a one-way clutch means coupled between said output shadt and said turbine shaft for connecting and disconnecting said shafts to and from each other, said one-way clutch means, when engaged, directly connecting said output shaft and said turbine shaft to transmit power from said output shaft to said turbine shaft, said one-way clutch means including:
    a driving member connected to said output shaft and provided with a conical, driving outer circumferential surface,
    a driven member connected to said turbine shaft and provided with a conical, driven inner circumferential surface opposed to said conical driving surface,
    wedge rollers provided between said driving and driven members, and
    means associated with said driving member for engaging and disengaging with and from each other in response to hydraulic pressure applied thereto; and
    (h) a load capacity control means coupled to said one-way clutch means for varying the load capacity thereof when said one-way clutch means is in an engaged state.

3. A control system for operation of a fluid torque converter for vehicles according to claim 2 wherein said load capacity control means includes a hydraulic pressure control valve means for controlling the pressure of working oil for operating said means for engaging and disengaging said driving and driven members of said one-way clutch means.

4. A control system for operation of a fluid torque converter for vehicles according to claim 3 wherein said hydraulic pressure control valve means includes means for temporarily decreasing the load capacity of said one-way clutch means when a degree of opening of a throttle, coupled thereto, is suddenly increased.

5. A control system for operation of a fluid torque converter for vehicles according to claim 3 wherein said hydraulic pressure control valve means includes means for controlling the working oil such that said one-way clutch means is moved to the engaged state when the vehicle speed has exceeded a predetermined level.

6. A control system for operation of a fluid torque converter for vehicles according to claim 3 wherein said hydraulic pressure control valve means includes means for temporarily decreasing the load capacity of said one-way clutch means when a degree of opening of a throttle, coupled thereto, is increased suddenly and for controlling the working oil such that said one-way clutch means is moved to the engaged state when the vehicle speed has exceeded a predetermined level.

7. A control system for operation of a fluid torque converter for vehicles according to any one of claims 4-6 wherein said hydraulic pressure valve means includes a cylinder having a high pressure port, a low pressure port and an intermediate pressure port and a valve body means slidably fitted in said cylinder.

8. A control system for operation of a fluid torque converter for vehicles according to claim 7 wherein said load capacity control means includes a throttle responding valve means, said throttle responding valve means comprising a cylinder, a high pressure port, a low pressure port and an intermediate pressure port, a spool slidably fitted in said cylinder and a throttle rod slidably fitted in said cylinder, said throttle rod moving in response to the operation of a throttle of the vehicle.

* * * * *